United States Patent [19]
Levin et al.

[11] Patent Number: 5,231,578
[45] Date of Patent: Jul. 27, 1993

[54] APPARATUS FOR DOCUMENT ANNOTATION AND MANIPULATION USING IMAGES FROM A WINDOW SOURCE

[75] Inventors: Stephen R. Levin, North Andover; Kenneth H. Abrams, Sudbury; Raymond S. Burns, North Andover, all of Mass.; Alex J. Harui, Derry, N.H.; David R. Lakness, Westford; Ronald F. Rudis, North Andover, both of Mass.

[73] Assignee: Wang Laboratories, Inc., Lowell, Mass.

[21] Appl. No.: 611,433

[22] Filed: Nov. 13, 1990

Related U.S. Application Data

[63] Continuation of Ser. No. 360,656, Jun. 2, 1990, abandoned.

[51] Int. Cl.⁵ ............................................. G06F 15/74
[52] U.S. Cl. .................................... 364/419; 395/275; 364/DIG. 1; 364/225.8; 364/237.1; 364/286.3
[58] Field of Search ........................................ 340/721; 364/200 MS File, 900 MS File, 419; 395/275

[56] References Cited

U.S. PATENT DOCUMENTS

| | | | |
|---|---|---|---|
| 4,424,575 | 1/1984 | Clarke et al. | 364/900 |
| 4,475,239 | 10/1984 | Raamsdonk | 382/57 |
| 4,514,818 | 4/1985 | Walker | 364/521 |
| 4,633,416 | 12/1986 | Walker | 364/521 |
| 4,633,436 | 12/1986 | Flurry | 564/900 |
| 4,649,380 | 3/1987 | Penna . | |
| 4,677,428 | 6/1987 | Bartholow | 340/708 |
| 4,688,031 | 8/1987 | Haggerty | 340/793 |
| 4,714,918 | 12/1987 | Barker et al. | 340/724 |
| 4,734,619 | 3/1988 | Havel . | |
| 4,755,809 | 7/1988 | Ikegami et al. | 340/724 |
| 4,899,136 | 2/1990 | Beard et al. | 364/900 |

FOREIGN PATENT DOCUMENTS

| | | | |
|---|---|---|---|
| 0114631 | 2/1984 | Japan | 340/721 |
| 0125425 | 7/1984 | Japan | 340/721 |
| 60-218128 | 10/1985 | Japan . | |

OTHER PUBLICATIONS

"The Apple Macintosh Computer: Mouse-Window-desktop technology arrives for under $2500," by C. Williams *BYTE* Publications, pp. 30-54, Feb. 1984.
*The Complete Book of Macintosh-Assembly Language Programming*, vol.-II, Weston, pp. 26-147, ©1987.
*Macintosh System Software User's Guide Version 6.0*, by Apple Computer, Inc. 1988 pp. 58-69.
IBM Technical Disclosure Bulletin, vo. 27, No. 10B, Mar. 1985, New York, p. 5966 'Creating A Footnote For A Table Or Graphic Object'.
Goodman, Danny, *The Complete HyperCard Handbook* (BantamBooks 1987), pp. 32-34.
Microsoft Corporation, *Show Partner User's Guide* (1986), Chaps. 3,4, pp. 27-48.

(List continued on next page.)

*Primary Examiner*—Lawrence E. Anderson
*Attorney, Agent, or Firm*—Kenneth L. Milik

[57] ABSTRACT

A data processing system provides annotation of a document through an electronic tablet, a keyboard and an audio assembly. An annotatable document is generated from a window of a multiwindow support program running independently of the annotation program in the data processing system. For each window of the multiwindow program, a working document is generated and is annotatable by the annotation program and apparatus. An annotatable document is also generated from the whole screen view of overlapping windows produced during execution of the multiwindow support program. Annotated working documents may be subsequently stored in and thereafter retrieved from the database of the multiwindow support program.

44 Claims, 12 Drawing Sheets

OTHER PUBLICATIONS

"Macintosh MacPaint," copyright 1983, by Apple Computer, Inc. Cupertino, Calif., pp. 1-32.

"Method for Creating Annotation Data," IBM Technical Disclosure Bulletin, vol. 28, No. 4, Sep. 1985, pp. 1623-1628.

"The Complete Book of Macintosh Assembly Language Programming," Weston, D., published 1987 by Scott, Foresman and Co., Ill., pp. 27-147.

"The Samll talk Environment" by Tesler, L., BYTE Magazine, Aug. 1981, pp. 90-144.

"The Lisa Computer System: Apple Designs a New Kind of Machine," by Williams, G., BYTE Magazine, Feb. 1983, pp. 33-50.

"Method of Multiple Selection of Icons On a Computer Display By Using a Pointing Device," IBM Technical Disclosure Bulletin, vol. 31, No. 1, Jun. 1988, pp. 19-20.

"Macintosh," published 1983 by Apple Computer, Inc., Cupertino, Calif., pp. 13-109 & 147-154.

"System for Integrating and Collating Audio and Text, and For Text Creation and Editing," by P. D. Welch, IBM Technical Disclosure Bulletin, vol. 16, No. 2, Jul. 1973, pp. 500-503.

"A Pair of Digitizing Tablets," MACWORLD, published Mar. 1987 by PCW Communications, Inc., San Francisco, Calif., pp. 143-144.

APPARATUS FOR DOCUMENT ANNOTATION AND MANIPULATION USING IMAGES FROM A WINDOW SOURCE

RELATED APPLICATIONS

This application is a continuation of application Ser. No. 07/360,656, filed on Jun. 2, 1990, now abandoned, which is a continuation-in-part application of U.S. patent application Ser. No. 07/265,686, filed on Nov. 1, 1988 (now abandoned) for an "Apparatus for Document Annotation and Manipulation with a Window Source" and assigned to the assignee of the present invention.

BACKGROUND OF THE INVENTION

In the business environment of today, many tasks are now automated by computers. For instance, a word processor enables the reorganizing and rewriting of documents without the retyping known in the past. In addition, various documents may be organized and stored by a computer filing system which allows retrieval by name, by chronological or alphabetical order, or by other user-desired identification. Another example is a mail system on a network of computer terminals which allows messages to be sent to and from users of the network. Also, a phone system may be connected to a mail system which in turn enables phone messages to be stored and later forwarded to users. These and other computer devices enable various daily office tasks to be accomplished more quickly and more efficiently.

However, most computer devices require the user to be computer literate and to learn commands to direct the computer to perform a certain task. In more recent computer developments, menus (a series of commands from which to choose) are displayed to the user at appropriate decision junctures during the use of a computer device. The menus are considered to make the computer device more "user friendly". Generally the choices on a menu are descriptive phrases written in terms which are more common to our everyday language rather than in a coded or technical computer language. Even so, the descriptive phrases may not initially have meaning, or at least the proper meaning, to a first-time user or a user who is not computer literate. Thus, many office personnel do not make use of computer devices because of the time and complexity required to learn to operate these devices.

Accordingly, there is a need to make computer devices, and particularly those for office use, more initially "user friendly" or readily useable especially to first-time and computer illiterate users.

SUMMARY OF THE INVENTION

Related U.S. patent application Ser. No. 07/200,091, filed on May 27, 1988, for a "Document Annotation and Manipulation in a Data Processing System" and assigned to the assignee of the present invention discloses a computer device which is a degree friendlier than the menu driven computer devices of the prior art. That computer device employs an electronic stylus and an electronic tablet which emulate a pencil and desk pad of paper used by the common business person. The electronic stylus and tablet are associated with the terminal of a digital processing system which has a monitor screen for displaying the strokes input by the electronic stylus and those input by a keyboard. An audio input/output assembly is alternatively connected to the terminal to provide voiced or other audio input to the digital processing system.

User interaction with the processing system in that device is through movement of the stylus with respect to the tablet. During use of the stylus two major views are viewed on the monitor screen, a desk view and an annotation session view. The desk view emulates a user's desk and pieces of paper which are stacked on and moved about his desk. In a preferred embodiment the desk view shows a stamp which is a reduced or miniaturized image of an actual page of each document presently on the user's system desk or computer work area. Each stamp serves as a unique direct pictorial representation of a certain document on the user's system desk as opposed to an indirect indication such as a prefabricated standard icon which is used for all documents of a certain type and which identifies a specific document only by a name or title associated with the icon.

The annotation session view provides a full screen size view of the document to be annotated or created by data input through the stylus, keyboard and/or audio input/output assembly. The document to be annotated may be chosen in three different manners. In one way, the document may be chosen from a program being currently run by the operating system. The user simply places one end of the stylus within a predetermined proximity of the surface of the tablet. When such proximity is sensed, the currently running program is temporarily stopped, preferably by a microprocessor interrupt, the view from that program being displayed at that time becomes the document to be annotated. In preparation for annotation if the screen is currently in a text mode, as opposed to a bit map mode, the data processing system changes the screen to a bit map or graphics mode. Text is converted to graphics by a character generation scheme. Also the dark background with light print of the text mode is reversed to a light background with dark print to more effectively simulate print on paper. Once prepared for annotation, the document may be annotated with visual annotations input through the stylus and/or keyboard and/or annotated with audio annotations input through the audio input/output assembly.

The present invention enables a document to be chosen from a program which supports the running of multiple windows. In particular, the multiple window support program manages a database of images and enables user querying of the database for desired images. The search results from a user query of the data base provides a display of an image in a dedicated image window on the monitor screen. Within that window the user is able to view, copy, print or send the image displayed therein. The program enables a prescribed number, for example 3, of image windows to be displayed on the monitor screen at one time. Typically, but not necessarily, the image windows overlap one another.

In accordance with the present invention, during the running of this program, the user may touch an end of the stylus on the tablet to capture the full screen view of the overlapping windows currently being displayed and/or to capture individually each image window displayed at this time. Each captured item provides an independent document which is annotatable through the annotation system.

One embodiment of the present invention captures the full screen view of the overlapping windows and each image window and forms stamps to represent each captured item. The stamps are initially found in the In-box on the user's system desk which is displayed after the capturing process.

In another embodiment, the full screen view of overlapping windows is captured for annotation upon the user touching an end of the stylus to the tablet. An annotation session is initiated with the captured screen (i.e. the full screen view of overlapping windows) being the document to be annotated. A menu of the annotation session enables the user to end the annotation session of the captured full screen view of the overlapping windows (a document at this time) and to obtain the desk view with a stamp of an overlapping window document in the In-box. Also in the desk view is an image capturing icon. Upon the user touching and lifting a stylus end on the tablet position corresponding to the image capturing icon, each image window from the overlapping window screen view is individually captured as a separate document. For each of these captured images/documents, a corresponding stamp is formed and appears in the desk view In-box.

In either embodiment, subsequent manipulation of the stamps and annotation of the corresponding documents is then performed as described in the related application Ser. No. 07/200,091. In addition, the processing system enables a user to store documents from the user's system desk into a desired database, for example the database of images managed by the multiple window support program. Subsequent retrieval of a desired document from a database is also enabled. This is accomplished through a file cabinet icon illustrated on the user's system desk. By the user selecting the icon with the stylus, a search routine is initiated. The search routine provides a search form in which the user specifies the desired document and particular database from which to retrieve the document. The user uses stylus and/or keyboard input to complete the search form. The search routine then performs a search with the criteria inserted on the search form. Thereafter, the search results are displayed for user selection.

Document storage is provided in a similar manner. Through operations of the stylus on a tablet, the user positions a stamp of a desired document so that it just touches or largely overlaps the file cabinet icon. Upon positioning of the stamp on the file cabinet icon, the processing system provides a store form on the user's system desk. The user completes the store form by inserting with the stylus and/or keyboard the name of the image to be stored, the desired database in which the image is to be stored, and other pertinent information. Upon completion of the store form, the user selects a menu selection to store the indicated image in the indicated database. The processing system responds to such actions of the user by storing the specified image in the specified database and resuming display of the user's system desk with the stamp of the desired document in its initial position before it was moved adjacent to the file cabinet icon.

BRIEF DESCRIPTION OF THE DRAWINGS

The foregoing and other objects, features and advantages of the invention will be apparent from the following more particular description of illustrative embodiments of the invention, as illustrated in the accompanying drawings in which like referenced characters refer to the same parts throughout the different views. The drawings are not necessarily to scale, emphasis instead being placed upon illustrating principles of the invention.

DETAILED DESCRIPTION OF THE PREFERRED EMBODIMENT

Figure 1:
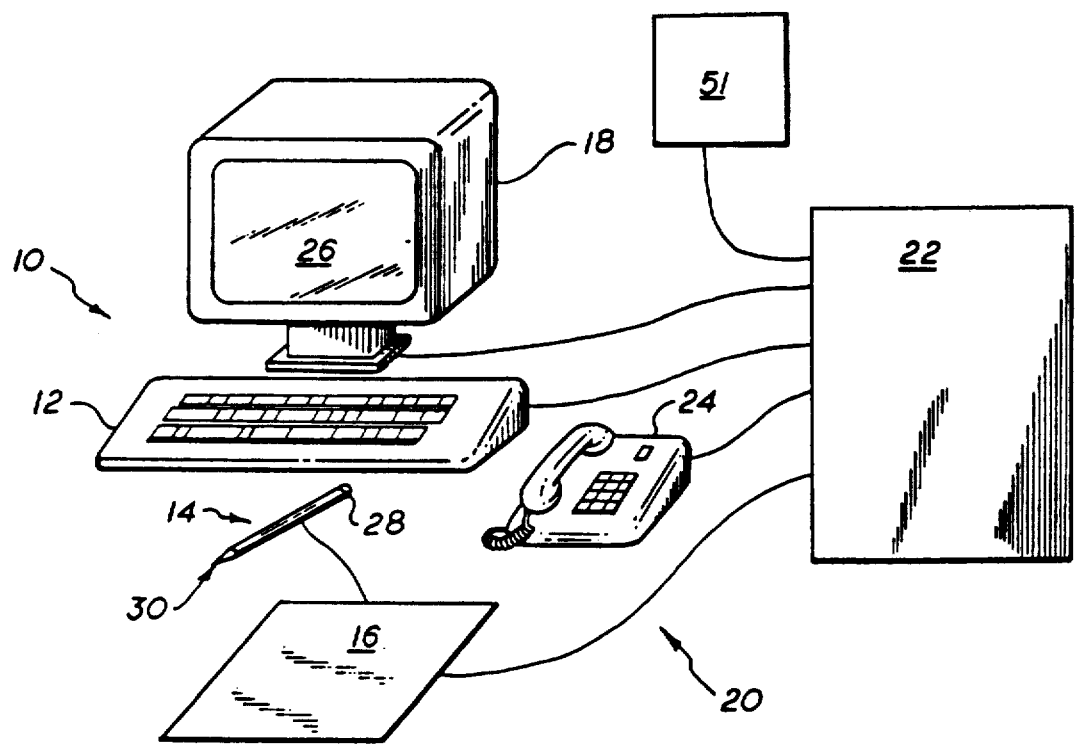
FIG. 1 is a schematic view of a data processing system which embodies the present invention.

A data processing system which embodies the present invention is illustrated in FIG. 1. The system 20 includes a computer terminal 10 with a keyboard 12 and a display unit 18, a two-ended electronic stylus 14 and an electronic tablet 16, all of which are connected to and driven by a digital processor 22. Digital processor 22 may be of the multitask type but a single task type is assumed in the description of the preferred embodiment. Preferably an audio assembly 24 having input and output ports such as a telephone set, is also connected to the terminal 10 for combining voice with visual annotations input through the stylus 14 and keyboard 12.

The stylus 14 is used on an upper planar surface of the tablet 16 to perform certain tasks such as writing a message and correcting a part thereof, creating a new document, or retrieving and annotating an existing document. The actions of the stylus 14 on the surface of the tablet 16 are displayed on the display unit 18 and the positions on the tablet have a one to one correspondence with the view 26 displayed on the display unit 18. Thus, as the user applies the stylus 14 to the tablet surface, an image representation of what the user is doing with the stylus is provided in the view 26 of display unit 18. The working elements of display unit 18, stylus 14 and tablet 16 are described in detail in the related U.S. patent application Ser. No. 07/200,091 and are only summarized hereafter as necessary.

The two-ended stylus 14 operates from either end, the writing tip end 30 or the eraser end 28. The writing tip end 30 and the eraser end 28 are alternatively driven by a tablet processor. When one end is moved into and sensed in proximity (about 2 cm or less) of the tablet surface, then just that end is driven. When the writing tip end 30 is in proximity of the tablet surface it alone is driven in response to three different manners of operation to provide three different effects. Likewise, when the eraser end 28 is driven alone, it provides three different effects to three different manners of operation.

A "touch and lift" operation of the writing tip end 30 or the eraser end 28 is used for selecting a displayed item. Preferably, once the stylus end 28, 30 makes contact with the tablet surface, the "touch" part of the operation is defined but the user must lift the stylus end 28, 30 from the tablet surface within the succeeding second or so to define the "lift" portion of the operation. A "touch and move" operation enables the user to move a displayed item anywhere in view 26 of display unit 18. The operation is invoked upon the user placing a stylus end 30, 28 on the tablet surface and moving the stylus end 30, 28 while maintaining it in contact with the tablet surface for more than a preset number of pixels, for example about four pixels. The third manner of operation is writing with the writing tip end 28 of the stylus 14 to insert markings on a chosen displayed document. The third manner of operation of the eraser end 28 is erasing with the eraser end 28 to remove desired parts of markings which have been made by the writing tip end 30 within the same session of writing/erasing on a chosen displayed item.

Generally, the data processing system 20 provides two environments in which annotation and manipulation of documents is performed. One environment is best described as a computer work area called the user's system desk which contains images of all the documents in the user's possession. The second environment provides a view of a single selected document including a new document and enables annotation or creation of that document with stylus-written/erased, keyboard-typed and audio-inputted annotations. The second environment is referred to as the "annotator" and may be invoked from any view on display unit 18 at any time. In particular, the annotator may be invoked during any working program by the user placing an end of the stylus 14 in proximity of the tablet surface. This causes the processor 22 to capture the screen view currently being displayed and generate from the captured screen view an annotation-ready document.

Figure 2:
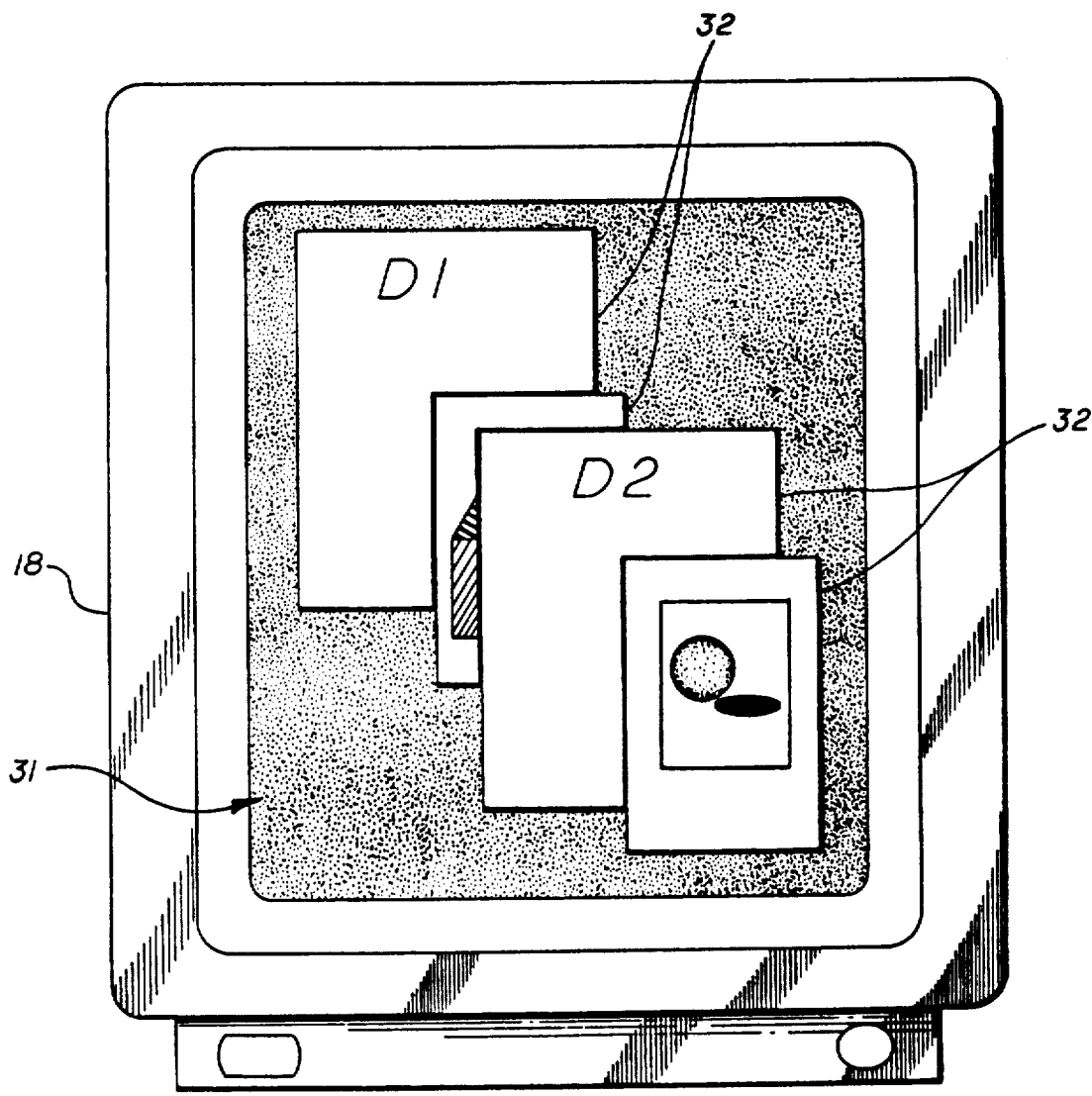
FIG. 2 is an illustration of a view displayed during the running of a multiwindow support program.

However, in the case where a multiwindow support program is running which provides various windows 32 (FIG. 2) for displaying images selected from a database of images, invocation of the annotator is not immediate but through the user's system desk. During such a multiwindow support program a user is able to query the image database for desired images. In response to a query, the program performs a search in the database and provides results of the search in various windows 32 on the screen of display unit 18. Each window 32 holds an image requested by the user. In the case of more than one window 32 displayed at the same time, the program may overlap the image windows 32 as shown in FIG. 2.

To invoke the annotator at this time, the user places the writing tip end 30 or eraser end 28 of the stylus 14 in proximity of the surface of tablet 16. The processor 22 responds to such positioning of the stylus 14 by causing each window 32 currently displayed on display unit 18 to become an annotatable document represented by an associated stamp 34 on the user's system desk 36 as shown in FIG. 3.

Figure 3:
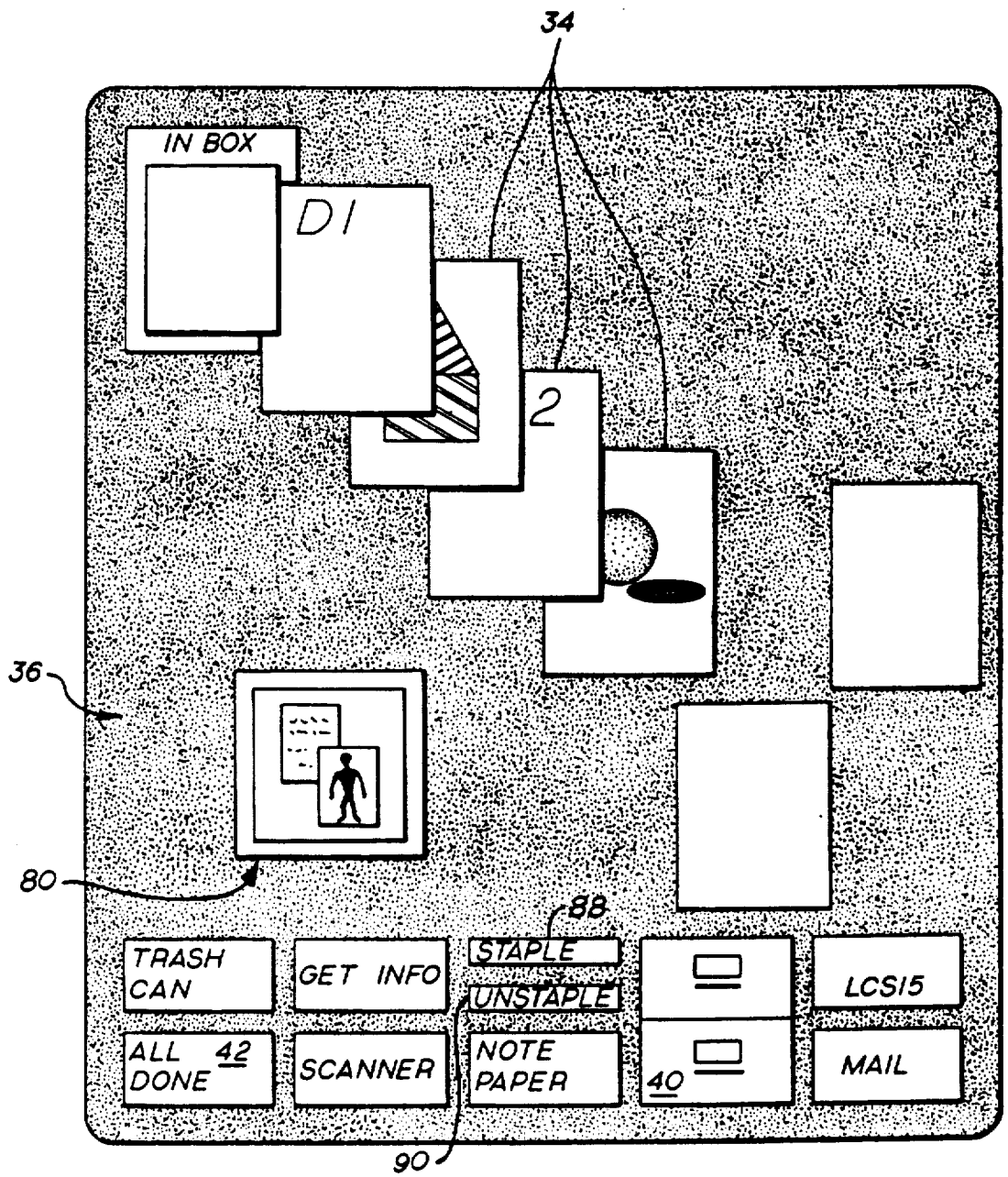
FIG. 3 is an illustration of the desk view employed in the data processing system of FIG. 1 in which the windows of the program in FIG. 2 have been individually captured as annotatable documents.

After effectively capturing each window and the composite multiwindow screen view to establish annotatable documents in the above manner, the user's system desk 36 is displayed through display unit 18 as shown in FIG. 3. Each document generated from the multiwindow screen view 31 (FIG. 2) is represented by a corresponding stamp 34. Preferably, the stamps 34 are initially stacked in the In-box 38 in the display of the user's system desk 36. The user is able to remove each document stamp 34 from the In-box by the "touch and move" manner of operation of the stylus 14 on the tablet 16. Once the user has removed each stamp 34 from the In-box, the user may reposition the stamps as desired on the user's system desk 36 by multiple operation of the stylus 14 in the touch and move manner. Upon the user's selection of a stamp 34 by the user "touching and lifting" the stylus end 28, 30 on the tablet position corresponding to the desk view position of the stamp 34, the processor 22 drives display unit 18 to exhibit a full screen size view of the document represented by the selected stamp 34. And the processor 22 thus invokes the annotator for the displayed document.

Subsequent annotation and returning to the user's system desk 36 or the previously running working program is as described in the related application Ser. No. 07/200,091 (i.e. through a pop-up menu).

In an alternative embodiment of the present invention, a user captures image windows during the running of the multiwindow support program and invokes the annotator for those captured documents as follows. During the running of the multiwindow support program with the desired images displayed in various windows in the screen view 26, the user places one end 28 or 30 of the stylus 14 in proximity of the tablet surface. The processor 22 responds by causing the currently displayed full screen view of overlapping windows to become an annotatable document and the annotator to be invoked for that document.

The user may annotate the composite multiwindow document with the writing and eraser ends 28, 30 of the stylus 14, keyboard 12 and/or audio assembly 24 as described above. During the session of annotation, a menu offers to the user the choice to go to the desk view. Selecting this menu pick with the "touch and lift" operation of the stylus 14 changes the screen view 26 from the full screen view of the annotated composite multiwindow document to the desk view. A stamp of the annotated composite multiwindow document appears in the In-box of the desk view now displayed on display unit 18. If no annotations were made to the composite multiwindow document during the initially invoked annotation session, then no corresponding stamp of the composite multiwindow document appears in the desk view at this time.

Figure 8:
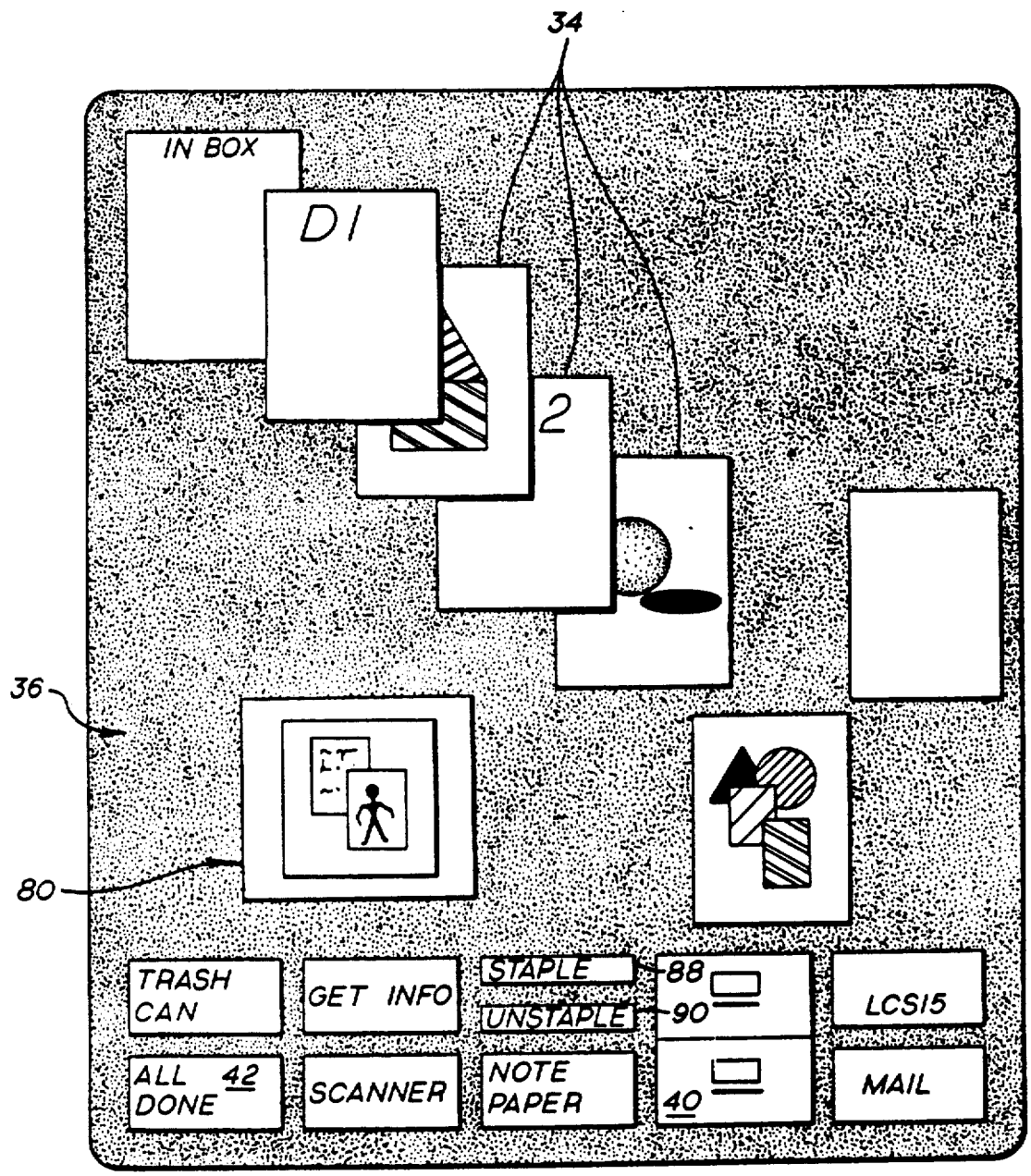
FIG. 8 is an illustration of the desk view employed in another embodiment of the invention.

From the image capturing icon 80 (FIG. 8) in the desk view, the user captures individually the image windows of the composite multiwindow screen view captured from the running of the multiwindow support program. Specifically, the user touches and lifts an end of stylus 14 on the tablet position corresponding to the screen view position of icon 80 in the desk view. Upon lifting of the stylus end, the processor 22 captures each image window independently and establishes therefrom annotatable documents. Processor 22 also configures corresponding stamps 34 for the newly obtained documents and places these stamps in the In-box on the user's system desk 36 shown in FIG. 8. After stamps 34 for the image window documents appear in the In-box in the desk view, the user is able to remove each document stamp 34 from the In-box by the "touch and move" manner of operation of the stylus 14 on tablet 16 as illustrated by FIG. 8. Thereafter, the user may reposition the stamps 34 by the "touch and move" operation of the stylus 14 and/or select a stamp 34 for annotation by the "touch and lift" operation of stylus 14 as previously described.

During display of the system desk 36 as shown in FIG. 8, a second "touching and lifting" operation of stylus end 28, 30 on the image capturing icon 80 causes image copies of the individual image window documents which have been annotated through the annotator to be returned to the database of images of the multiwindow support program. Preferably, the returned annotated images replace the images originally (or currently) residing in the database that provided the respective image window. Such replacing is accomplished by overwriting the memory area of the respective original image with the annotated image. During a subsequent running of the multiwindow support program, the annotated image will be provided in a window instead of the original image in response to user queries for the original image.

In a specific alternative working embodiment of the present invention, the returned annotated images replace the respective unannotated screen images previously displayed by the multiwindow support program in connection with a host application. After returning to the host application, the user invokes another operation in order to permanently save the annotated images in the database of the host application for subsequent retrieval and viewing. Thus, the annotated images can be saved along with the unannotated originals or the annotated images can permanently replace the unannotated ones.

Depicted in FIG. 8 is a Staple block 88 which operates like a stapler for attaching various stamps 34 to one another. As further explanation, when various stamps 34 are placed in a pile, one on top of another, they can be "stapled" together to form a set by moving the Staple block 88 and placing it onto that pile. After the staple operation is performed, the Staple block 88 returns to its original resting place. An Unstaple block 90 is also provided for unstapling any set of stapled stamps. Detailed descriptions of the stapling and unstapling operations are given in a related U.S. patent application having Ser. No. 245,419, which was filed on Sept. 16, 1988, for "Document Manipulation in a Data Processing System" and assigned to the assignee of the present invention.

In the aforementioned specific alternative working embodiment of the present invention, a stapled set of stamps 34 can be moved via the stylus to the image capturing icon 80. When the stapled set of stamps overlaps the icon 80, they are removed from the user's system desk 36 and the corresponding image documents represented by that set of stamps are returned to the multiwindow support program so that they are displayed one image document per window. Since any of the stamps on the user's system desk 36 can be stapled together, the present invention is not limited to only those stamps which were brought to the desk from the multiwindow support program by activating the image capturing icon 80. This stapling arrangement thus allows many stamps to be returned with one return operation instead of laboriously performing the same return operation one at a time for each of the many stamps desired to be sent back.

It should be understood from the above that in one embodiment of the present invention, user activation of the image capturing icon 80 by the aforementioned "touch and lift" operation of the stylus 14 results in stamps appearing in the In-Box of the desk view from window images of the multiwindow support program. If annotations, using the annotator and procedure described in the related application Ser. No. 07/200,091, are then made to any of the documents represented by these stamps, the annotated documents may be returned to the database of images of the multiwindow support program by subsequent user activation of the image capturing icon 80. However in another alternative embodiment of the present invention, return of the annotated documents is achieved in a different manner by moving the corresponding stamp (or stapled set of stamps) onto the image capturing icon.

In addition to the various stamps 34 of documents, the user's system desk 36 (FIG. 3) in any embodiment of the present invention provides indications of various depositories for documents and various operations of processor 22 that the user can elect to perform from the user's system desk. One depository as introduced above is labelled the "In-box" and is used for receiving all documents created by the user and any mail sent to the user. The other depositories and operations indicated on the user's system desk 36 and manipulation thereof are described in detail in the related application Ser. No. 07/200,091, with the exception of a file cabinet 40.

Figure 4A:
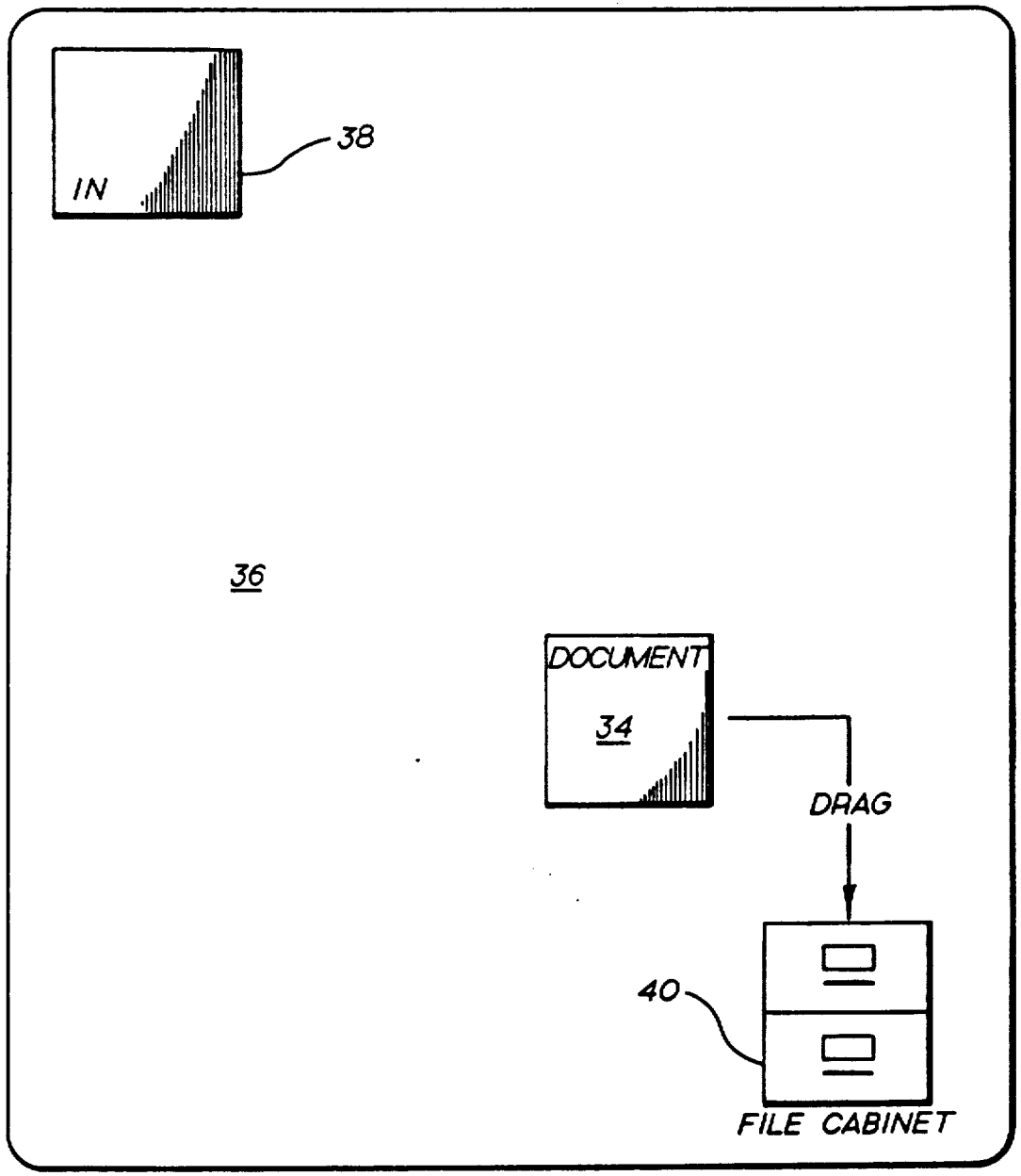
FIGS. 4a and 4b illustrate a sequence of views displayed from invocation of a document filing operation from the desk view in the data processing system of FIG. 1.
Figure 4B:
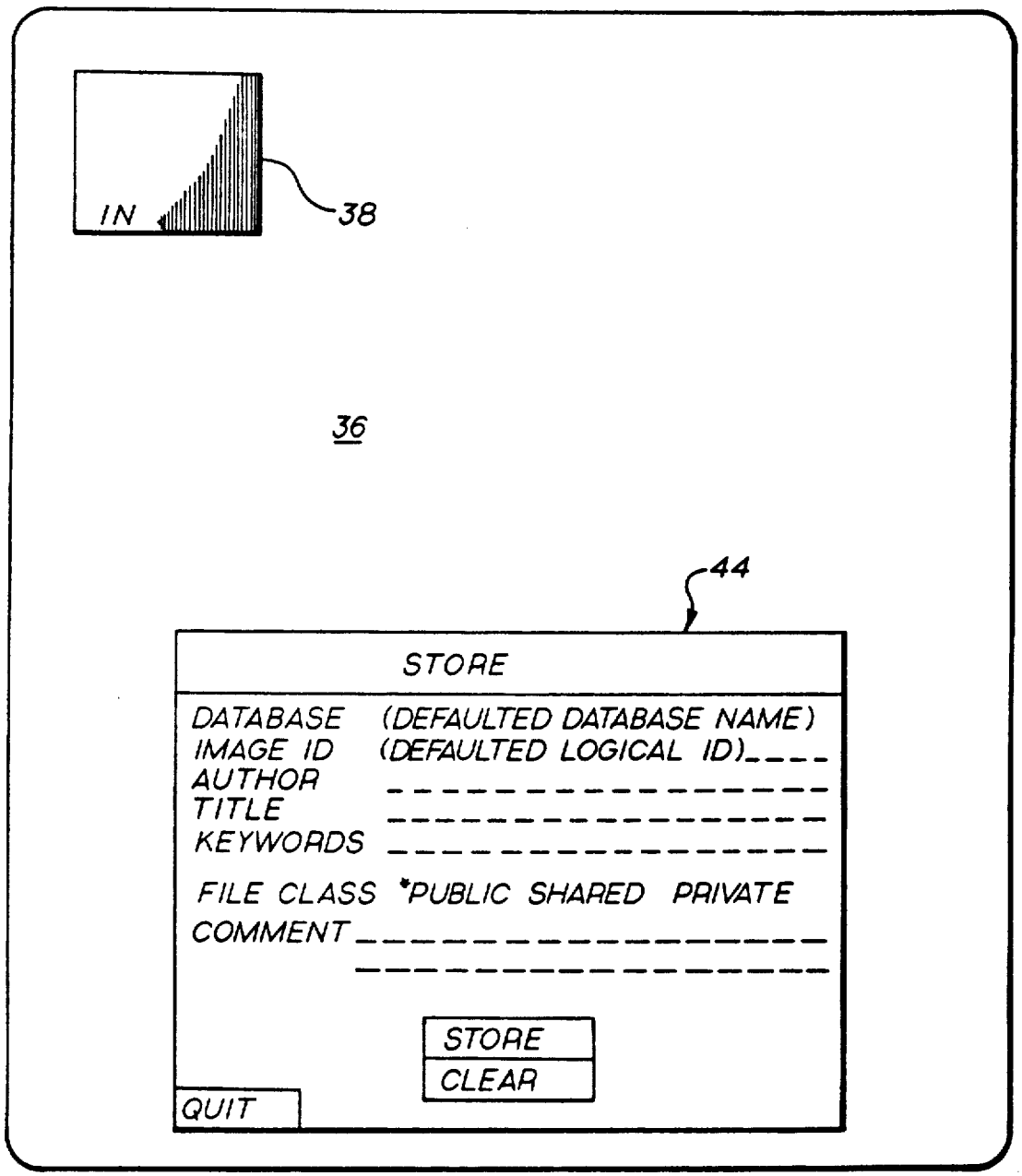

The operation of the file cabinet 40 icon is illustrated in FIGS. 4a–5d. The file cabinet 40 provides a user interface for exporting an annotated document from the user's system desk 36 into a desired database, for example the database of the multiwindow support program, and for importing a document from a desired database onto the user's system desk 36. To export or file a single document from the user's system desk 36, the user places one end of the stylus on the tablet corresponding to the position of the stamp 34 of the desired document displayed in the screen view of the user's system desk 36. After positioning the stylus in such a manner, the user maintains contact of the stylus end with the tablet 16 and moves the stylus 14 across the tablet to a desired position which corresponds to the screen position of the file cabinet icon 40. During such movement, the processor displays the desired document 34 stamp being moved from an initial position to a position overlapping the file cabinet icon 40 as illustrated in FIG. 4a. Upon the stamp 34 making contact with the file cabinet icon 40, the processor 22 displays a "store form" 44 in the screen view through the display unit 18 as shown in FIG. 4b.

The user completes the store form 44 using the writing tip end 30 of the stylus 14 and the keyboard 12. In the field of the store form 44 labelled "database", the user types and/or writes the name of the desired database in which the document of the selected stamp 34 is to be stored, for example, the database name of the multiwindow support program. The "Image Id" field is completed by insertion of the logical identification name of the desired document. The logical identification name corresponds to a superfile identification of the desired document. The database and image id fields may be automatically completed by the processor 22 with a default database name and the logical identification name corresponding to the selected stamp 34, respectively. The user then completes the fields designated author, title and keywords by typing or writing in the respective information. The words inserted into the "key words" field are used during a subsequent search for the document in the selected database. The "File Class" field is completed by the user selecting the type of access allowed to the document. Preferable, the types of access or classes available are public, shared or private. Other user comments may be inserted in the "Comment" field.

During the completing of the store form 44, the user may erase desired stylus markings or portions thereof by operating the eraser end 28 of the stylus on the tablet 16 positions corresponding to the desired displayed areas. To clear user inserted information from all of the fields of store form 44, the user selects the area labelled "clear" in form 44, with the touch and lift manner of operation of one end of the stylus 14 on the tablet position corresponding to the position of the labelled area in the screen view 26. Upon the user lifting the stylus end, the processor 22 effectively erases all the information that the user inserted into the various fields of the store form 44. If the user decides not to store the document into the database the menu selection "quit" can be chosen by a touch and lift operation of the stylus 14 on the position of the tablet 16 which corresponds to the position of the pertinent menu selection in the screen view of FIG. 4b. Selection of the "quit" menu pick returns the user to the desk view (FIG. 3a) with the stamp 34 of the desired document in its initial position before being moved to file cabinet icon 40.

After completing the store form 44, user selection of the "store" menu pick causes the processor 22 to store a copy of the document represented by the selected stamp 34 in the designated database, for example the database of the multiwindow support program. The screen view of the user's system desk 36 is then redisplayed with the stamp 34 of the selected document repositioned in its initial position.

In a preferred embodiment upon selection of the "store" menu pick, the processor 22 copies the actual image data associated with the selected document stamp 34 and passes the image data and its associated parameter block to a network communication manager. The network communication manager in turn passes the image and parameter block to an application, preferably written in either COBOL or PL/1 programming language, that stores the image data onto a magnetic or optical disk and updates two tables which support the target database (i.e. the database of the multiwindow support program). One of the tables is a locator table which provides the relationship between the physical identification on optical disk of an image to its logical identification which is supplied by the user in the "Image Id" field. The second table is the file cabinet table which relates the user designated author, keywords and logical identification to the image data for each image filed through the file cabinet icon 40. There is only one file cabinet table and it is unique to system 20 (FIG. 1).

Figure 5A:
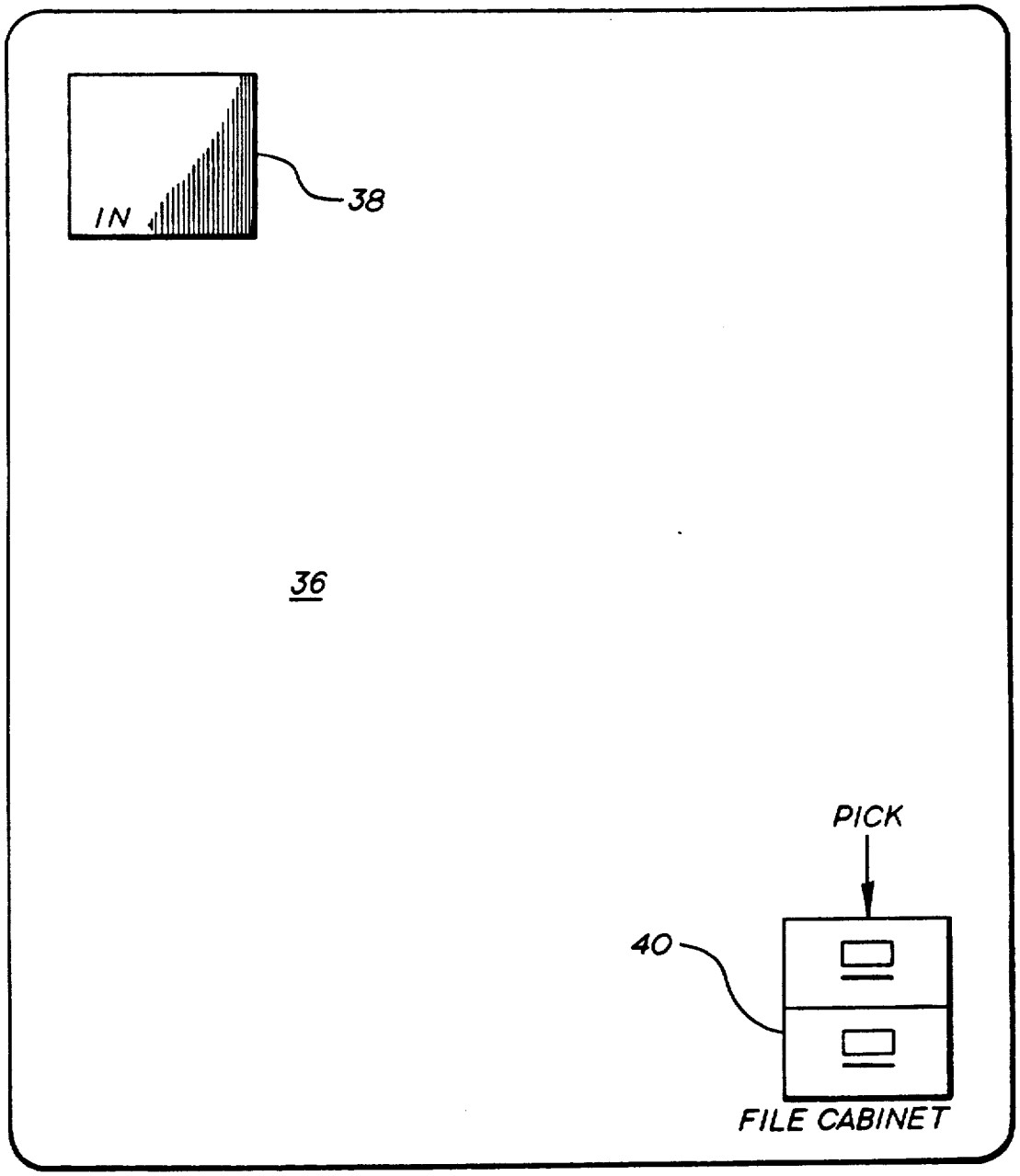
FIGS. 5a, 5b, 5c and 5d illustrates a sequence of views displayed from invocation of a document retrieve operation from the desk view of the data processing system of FIG. 1.
Figure 5B:
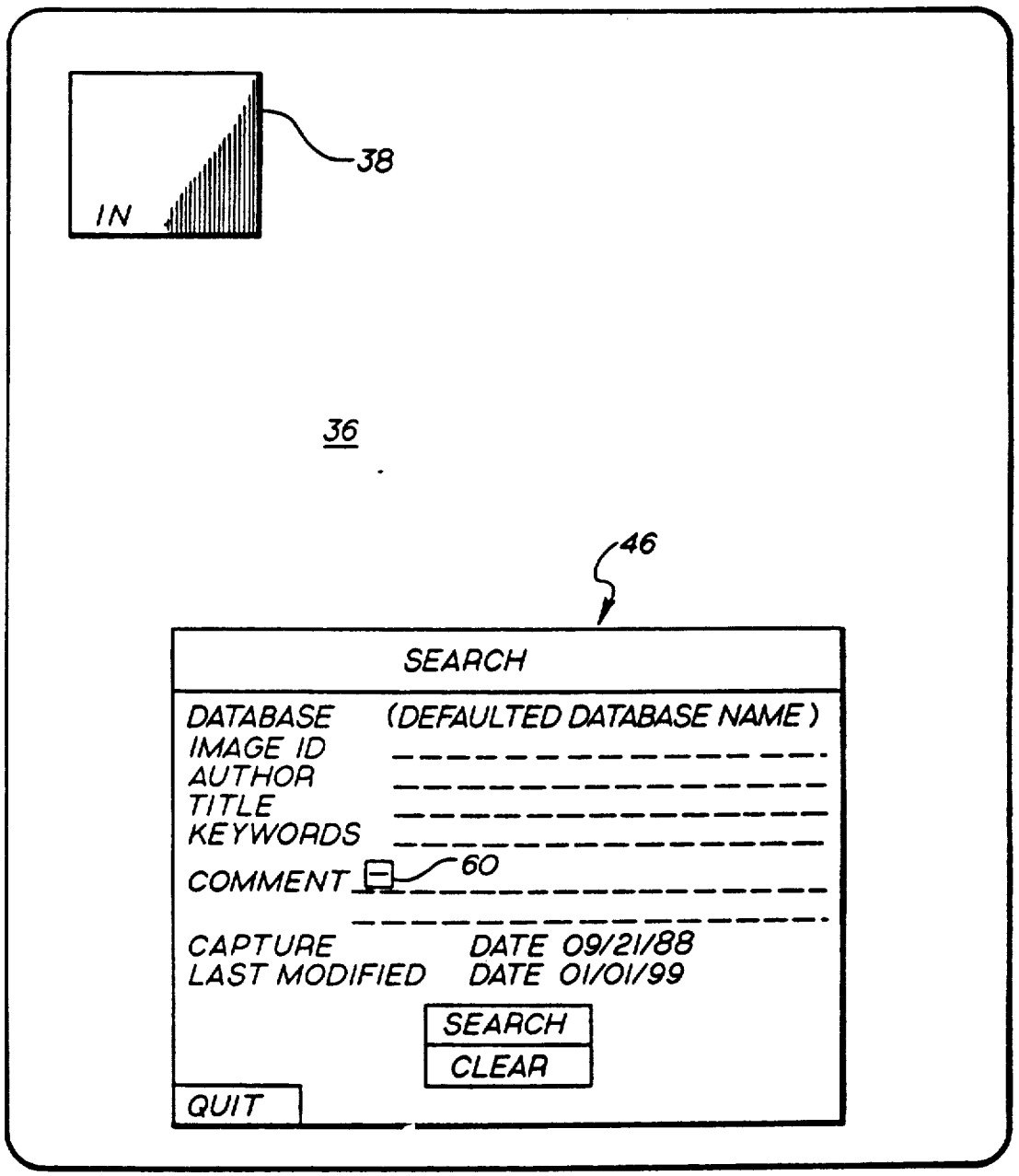

In order to retrieve an image from a database, the user selects the file cabinet icon 40 during the display of the user's system desk 36 as shown in FIG. 5a. Selection of the file cabinet 40 is by the user operating an end of the stylus 14 in a touch and lift manner at the position on the tablet 16 which corresponds to the screen position of the file cabinet icon 40. Upon such touching and lifting of the stylus, the processor 22 displays a "search form" on the user's system desk 36 through the display unit 18. As shown in FIG. 5b, the search form 46 has fields similar to the "store form" 44.

The "Database" field is automatically completed by the processor 22 with the name of a default database, such as the database associated with the multiwindow screen program. The user inserts the logical identification name or any portion thereof of the desired image in the "image id" field by writing with the stylus 14 or typing on the keyboard 12 with the keyboard cursor 60 positioned in the "Image Id" field. The author and title of the desired document are in a similar manner user inserted in the respective fields on the search form 46. Key words to perform the search are user selected and written/typed into the proper field. The user may also insert text in the "comment" field to provide further criteria for the search. The user provided information in the comment field is used to perform a random text search in the database designated in the "database" field.

It is understood that various symbols may be employed to semi-automate configuration of the search as is known in the art. For example, a question mark in a field may indicate to the processor to search all possible entries for that field. A semicolon between two entries in a field may indicate to search with regard to one of the entries or the other. A colon between a first entry and a second entry in a field may indicate to search all possible entries between the first entry and the second entry for that field. An ampersand between two entries in a field may indicate to search for the occurrence of both entries in that field.

If the user makes a mistake such as misspelling a word or name in the search form 46, he may use the eraser end 28 of a stylus 14 to remove the mistake written by the writing end 30 of the stylus. Otherwise, the user may select the "clear" menu pick by a touch and lift operation of the stylus 14 on the tablet 16 position corresponding to the screen position of the menu pick. In response to this menu pick, the processor 22 clears all the user inserted information from the search form 46 and provides a "clean" search form 46.

It is understood that alternative common methods of erasing typed insertions may also be used, such as the use of a "backspace" key during typing. Also the user may reposition the typing cursor 60 on the search form 46 by the touch and move operation of a stylus end on the tablet position corresponding to the cursor 60 position in the screen view.

If the user decides that a search is no longer desired, he may touch and lift an end of the stylus 14 on the tablet position corresponding to the "quit" menu selection. This causes the processor 22 to remove the "search form" 46 from the screen and display the desk view (FIG. 3).

Figure 5C:
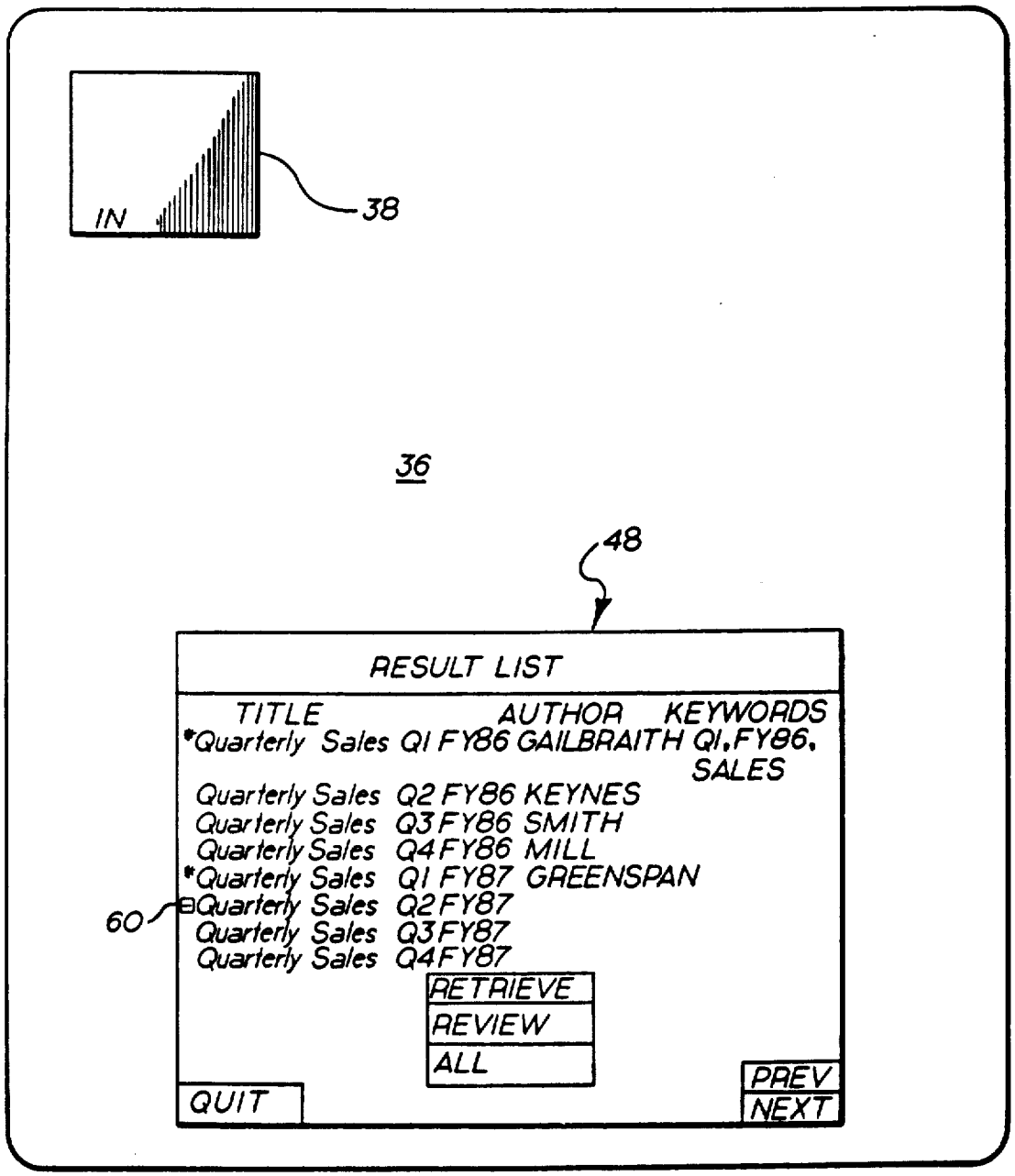

To proceed with the search after completing the search form 46, the user selects the "search" menu selection by touching and lifting an end of the stylus 14 on the corresponding tablet position. In response to selection of the "search" menu pick, the processor 22 generates a query with the user designated information on the search form 46. The query is passed to an application which processes the query on the user designated database. Preferably, the database is associated with an index, such as the file cabinet table discussed previously, which lists search information (e.g. title, key words, author) for each item stored in the database through the file cabinet. The query is processed with respect to the index which provides actual or indirect pointers to the images that satisfy the query. From the pertinent pointers, the application generates a result list which is transferred back through the communications network manager to the user's workstation 10 which displays the result list 48 on the desk view as shown in FIG. 5c.

The result list 48 indicates all images in the designated database which satisfy the criteria provided by the user on the "search form" 46. The result list 48 may be more than one page long and thus may be viewed page by page with the "prev" and "next" menu picks (FIG. 5c). To make a selection of either of these menu picks, the user operates the stylus 14 in the touch and lift manner on the corresponding tablet position. In order for a user to view a listed image, the user marks an asterisk or similar indicator next to the desired listed image title with the stylus writing tip end 30 or keyboard 12 and keyboard cursor 60. Alternatively, the user may select all listed images by selecting the "all" menu pick with a touching and lifting of the stylus 14 on the tablet 16 accordingly.

Thereafter, a user selection of the "retrieve" or the "review" menu selection will provide the selected images to the user in stamp or full-screen view form, respectively. Under the "review" menu selection, the processor 22 presents the selected images one by one in a full-screen view, in result list order. For each full screen view of a selected image, the user is provided with the menu selection of either "retrieve" to provide a stamp 34 of the currently displayed document in the In-box 38 on the user's system desk 36, "drop" to remove the indication of the image from the result list and present a full screen view of the next selected image, or "quit" to return to the result list screen view shown in FIG. 5c.

Figure 5D:
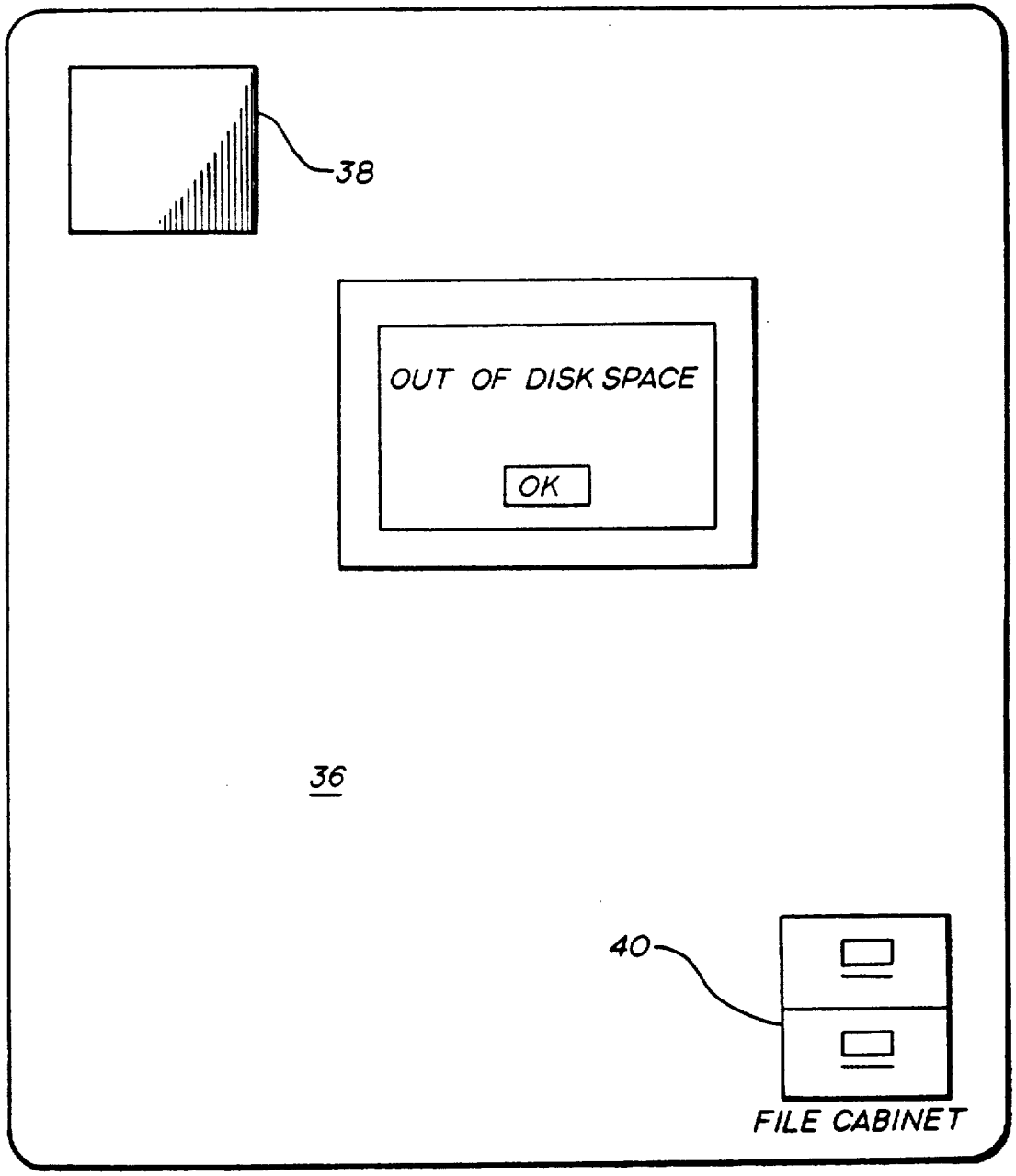

Under the "retrieve" menu selection from the result list screen view, the processor 22 provides a generation of a stamp 34 for each of the user selected images and delivers the stamps 34 to the In-box 38 on the user's system desk 36, in result list order, until no available disk space remains in system 20. If disk space becomes unavailable, an error message is provided in the desk view as shown in FIG. 5d. The error message after being read may be permanently removed from the desk view by the user touching and lifting a stylus end on the "O.K." menu pick of the screen view as shown in FIG. 5d.

With the exception of operating the stylus 14, the above is generally accomplished by known routines in the art for processing the search form 46 and manipulating the result list 48 according to user instruction. Each of the menu selections (i.e. "retrieve", "review", "all", "prev", "next", "quit") are supported by associated routines to accomplish the respective function (i.e. paging, marking or screen view change, etc.). After the user is finished with the search form 46 or result list 48 screen views, the processor 22 provides a display of the desk screen view with the stamps 34 and file cabinet 40 in the position in which the user last left them and with new stamps of any retrieved documents in the In-box 38. Thereafter, the user is able to move stamps 34 as desired by the touch and move operation of the stylus 14. The user may also annotate documents of stamps 34 upon selection of the stamp with the touch and lift operation of an end of the stylus.

A detailed discussion of the annotating of documents from the desk view may be found in the related application Ser. No. 07/200,091, which is herein incorporated by reference.

Multiwindow Support Program (MWSP) - System 20 Interface

In a preferred embodiment, all images of the multiwindow support program reside on an extended memory card (hereafter "Emm card"). During the running of the multiwindow support program, desired images are displayed directly onto the screen of display unit 18 from the Emm card. When the user places stylus 14 in proximity of tablet 16 to invoke the annotator of system 20, the multiwindow support program formats a parameter block on the Emm card for each image currently being displayed in a window 32 on display unit 18. Each parameter block states for the associated image the location or address of the image on the Emm card. In turn, processor 22 responds by reading the image addresses from the parameter blocks and therewith obtaining copies of the images from the Emm card. The images are thus generally initially imported to system 20 in expanded form. Thereafter processor 22 miniaturizes each image to form associated stamps 34 and formats the images to form corresponding annotatable documents. Processor 22 stores the stamps of the Emm card and records the Emm card address of the stamps in the parameter block for later use by system 20. Processor 22 forms an associated stamp and corresponding document of the composite multiwindow screen view from the bit map which generates the screen view.

Figure 6:
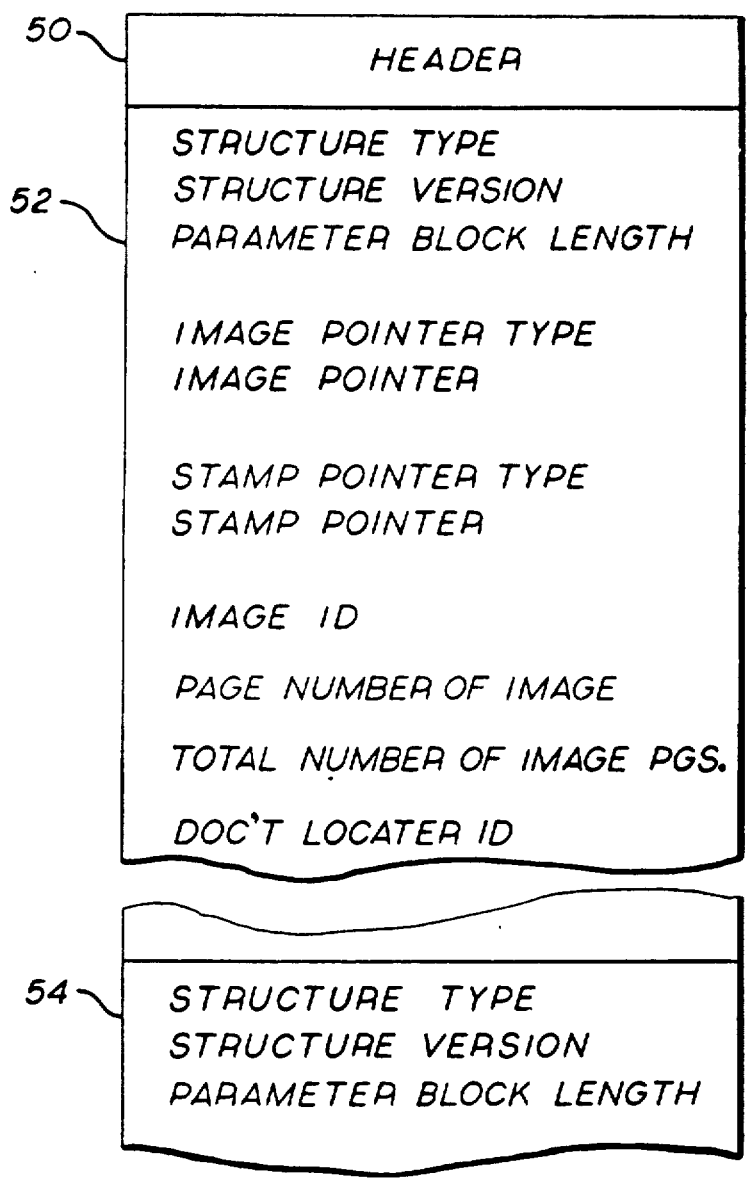
FIG. 6 is a schematic view of a data structure employed in the data processing system of FIG. 1 for holding parameter blocks of images from the multiwindow support program.

An illustration of the data structure holding parameter blocks 52, 54 of different images is provided in FIG. 6. The data structure has a header unit 50 which provides indications of the type and version of the data structure. Header unit 50 also provides an indication of the total length of the structure.

Each parameter block 52, 54 of the data structure has the same format which is now described with reference to just parameter block 52. It is understood that details of parameter block 52 apply to parameter block 54 and successive parameter blocks (not shown).

In a first byte of parameter block 52 the structure type is indicated. In a second byte the structure version is stated. The following two bytes hold an indication of the total length of the parameter block.

The succeeding byte indicates the type of image pointer given for the associated image. In the preferred embodiment there are four types of image pointers as follows:

| type 0 | an illegal null pointer |
| type 1 | a pointer to M/S DOS main memory |
| type 2 | a pointer to Emm card memory |
| type 3 | a pointer to certain option card memory |

The actual image pointer is provided in the following two bytes.

A stamp pointer and type is provided in succeeding bytes. The stamp pointer type corresponds to the image pointer type.

In the next two bytes is an identification number of the image. This number is used by the multiwindow support program to reference the image during the running of that program.

An image may span across several pages or screen views. Thus the image page number currently being viewed or accessed is provided in the following two bytes. The next two bytes provides an indication of the total number of pages of the image.

The last 20 bytes of the parameter block 52 provides a document locator identification. The multiwindow support program uses this location ID for identification purposes in local routines and procedures within that program.

Processor 22 employs a character device driver called SysConfig which enables inter-program communications. SysConfig is generally of the standard MS-DOS type. For performance and memory usage reasons, programs wishing to communicate with SysConfig do not utilize the standard device driver communication channels. Instead, communication is established by a program obtaining a far vector to the function dispatcher of SysConfig through a specific microprocessor interrupt. Once such a communication line is established, the program may call SysConfig directly without the additional overhead required for device driver communications.

Figure 7:
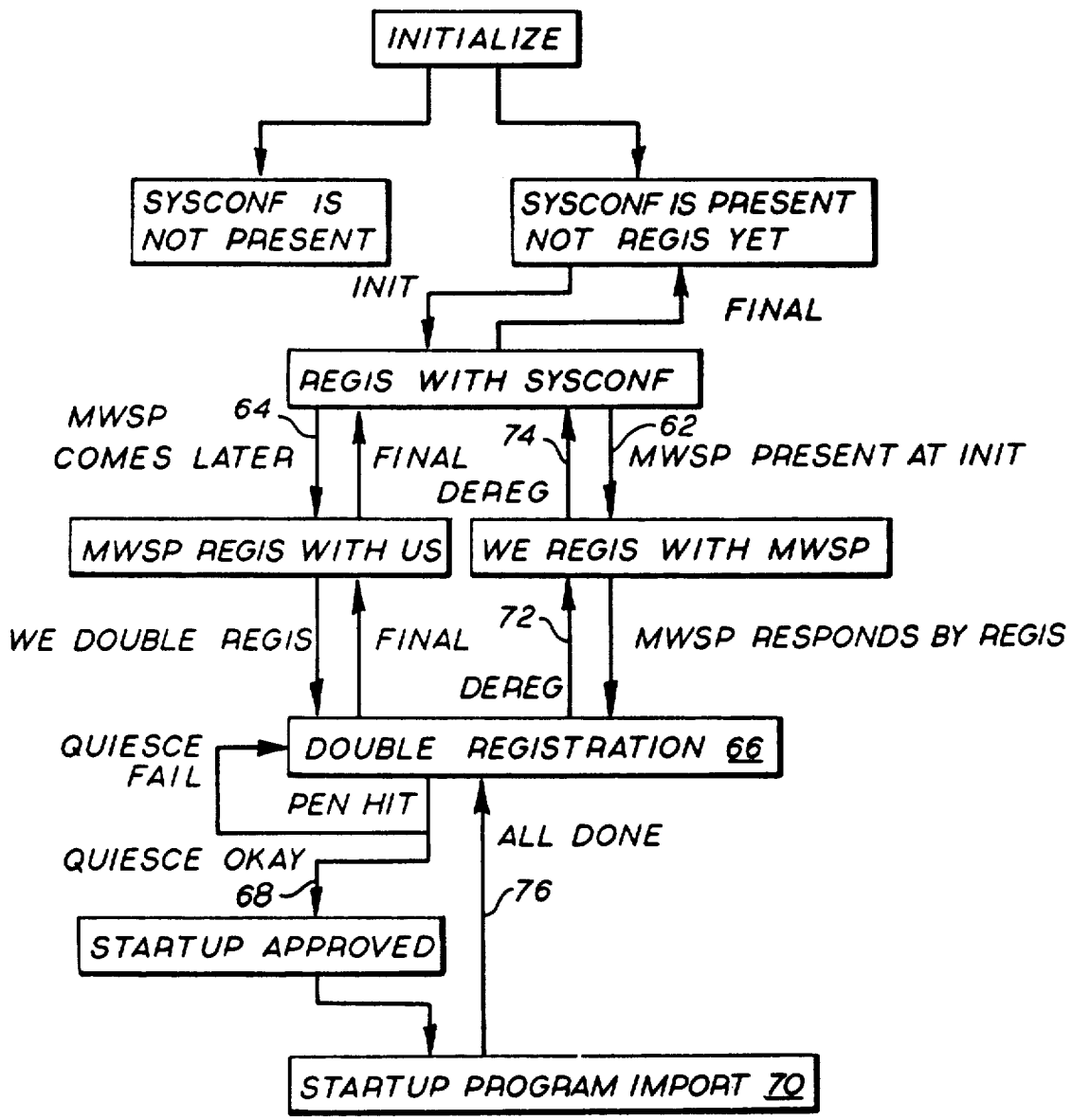
FIG. 7 is a flow diagram of the interface between the multiwindow support program and programs supporting the data processing system of FIG. 1.

With specific reference to the multiwindow support program and the supporting program of system 20, Sysconfig (via program calls to it) enables these programs to determine which is resident. Upon initialization of system 20, as illustrated in FIG. 7, the system 20 program checks if SysConfig is present and if so, registers with SysConfig the inter-process communications pointer (IPCP) of the system program. IPCP's are pointers to data or code which are posted with SysConfig for subsequent use by other programs. Global flags and pointers (such as a pointer to the entry port of the system 20 program) for SysConfig are also initialized as appropriate at this time. At 62 in FIG. 7, the system 20 program then calls and asks SysConfig if the multiwindow support program is initially present, and if so, registers the IPCP of the system program with the multiwindow support program.

Otherwise at the initialization of the multiwindow support program at 64 in FIG. 7, that program calls SysConfig and registers its IPCP with SysConfig. The program asks SysConfig if the system 20 program is present. If so, SysConfig provides the multiwindow support program with address and code means to call and register the IPCP of the multiwindow support program with the supporting program of system 20.

Whenever one of the programs registers its IPCP with the other program, the other program responds by registering back with its IPCP as shown at 66 in FIG. 7. This double registration ensures that both programs are synchronized with each other.

Thereafter the user is able to obtain the image viewing features of the multiwindow support program. During the running of that program, a positioning of the stylus 14 in proximity of tablet 16 triggers the certain microprocessor interrupt which obtains, for the system 20 program, the far vector to the function dispatcher of SysConfig. As a result, the system 20 program is able to communicate to the multiwindow support program via SysConfig.

Within the interrupt, a routine called takeover is invoked as described in detail in related U.S. patent application Ser. No. 07/200,091. At the beginning of that routine, procedure AppSwitch is invoked and determined whether the multiwindow support program is resident by querying SysConfig for the registration of that program. If the program is registered, then AppSwitch performs a call to the entry point indicated by the IPCP provided (via SysConfig) at the time the multiwindow support program registered with SysConfig. The call to the multiwindow support program asks that program to quiesce.

With receipt of the call and request to quiesce, the multiwindow support program obtains processor control and does whatever is necessary to put itself in a temporary static state so that the system 20 program may take over processor control. This includes closing open files, terminating outstanding processing and any pertinent screen processing. The multiwindow support program also prepares the parameter blocks 52, 54 and stamps for the images shown in windows 32 on display unit 18 at the time of the interrupt.

During the time that the multiwindow support program is quiescing, AppSwitch waits in a subordinate position. Once quiescing is complete (at 68 in FIG. 7), then the multiwindow support program returns control to AppSwitch which in turn continues the takeover routine with values returned in global registers from AppSwitch. One such value changes the initial application identification to procedure ImportApp. Another such value is the startup code for the application portion of the system 20 program. In another register, the value is the address of the prepared parameter blocks on the Emm card. One more register holds the IPCP index to the multiwindow support program for later use by the system 20 program.

The system 20 program continues at 70 in FIG. 7 by taking over processor control, importing the pertinent images with the aid of the address and pointer information on the prepared parameter blocks, making necessary files (e.g., super files, etc.) and displaying the desk view (e.g., FIG. 3). Operation of the system 20 program thereafter to implement the various features of the desk view and annotator is provided in detail in the related application.

When the user exits the desk view to return to the multiwindow support program at 76 in FIG. 7, the system 20 program returns control to the multiwindow support program via the IPCP held in the last mentioned register. At that time, the multiwindow support program deregisters with the system 20 program and SysConfig at 72 and 74 in FIG. 7. Thereafter the multiwindow support program rebuilds the screen of display unit 18 to display the view at the time of the interrupt. This is accomplished by the multi-support program having kept the pertinent image information from the quiesce procedure.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A data processing system having means for annotating a displayed document, the system comprising:
   a processor for executing programs;
   an annotation input device coupled to the processor;
   a display coupled to the processor for displaying screen views generated during processor execution of a program, the screen views including multiple windows generated during processor execution of an image managing program which retrieves images from a database; and
   an annotation routine responsive to the annotation input device to stop execution of the image managing program during display of multiple windows on the display, the annotation routine generating for each window displayed on the display a corresponding working document image annotatable by the means for annotating.

2. A data processing system as claimed in claim 1 wherein the annotation routine stops execution of the image managing program during display of overlapping multiple windows.

3. A data processing system as claimed in claim 1 further comprising file means for retrievably storing in the database a working document image annotated with user desired annotations input to the means for annotating through the annotation input device.

4. A data processing system comprising:
a processor programmed with a windowing program and an annotation program;
a display coupled to the processor displaying views generated during execution of a program including a screen view having windows when executing at least said windowing program; and
an annotation input device coupled to the precursor, said processor:
in response to a first input from said input device while executing said windowing program beginning execution of said annotation program, and saving a window image of each window currently being displayed in the screen view on the display, and
in response to a second input from said input device, while said annotation program is running, annotating a saved window image;
upon completion of annotating the saved window image in response to a third input storing said annotated saved window image containing any annotations made;
making a reduced image of said saved window, said reduced image containing recognizable and distinguishable details of said window image, said reduced image of each window image thus being unique; and
storing said reduced image containing any annotations made to said saved screen view.

5. Annotation device as claimed in claim 4 wherein the annotation input device includes a stylus.

6. A system as claimed in claim 4 wherein the processor in response to the first input further saves a screen image of the whole screen view of windows currently being displayed by said windowing program.

7. A system as claimed in claim 4 wherein the windows are overlapping in the screen view.

8. A system as claimed in claim 4 and further including stopping performance of all programs being currently executed by the processor and saving the state of the stopped programs in response to said first output and resuming execution of said stopped programs in response to said third input.

9. A system as claimed in claim 4 and further comprising a database storing the saved window image.

10. A system as claimed in claim 9 wherein said annotation program is capable of storing images in the database and retrieving images from the database including stored saved window images.

11. A system as claimed in claim 10 wherein said annotation program generates a file cabinet icon-to-user interface.

12. A display processing system comprising:
a processor running, as a primary task, a windowing program;
an electronic display coupled to the processor displaying, in a full screen view, at least two window views;
an annotation input device coupled to the processor; and
an annotation routine performed by the processor and responsive to the annotation input device to said a window from performance of the primary task, the annotation routine being further responsive to the annotation input device to individually annotate the saved window images, and to make a reduced image of each of said saved window images, said reduced image containing recognizable and distinguishable details of each of said window images, said reduced image of each window image thus being unique, and the annotation routine response to the annotation input device to store saved window images and reduced images, with any annotations made, and to return control to the primary task upon indication of completion of annotating.

13. A system as claimed in claim 12 wherein the annotation input device includes a stylus.

14. A system as claimed in claim 12 wherein the windows currently being displayed are displayed as graphically overlapping windows.

15. The system according to claim 12 and further including also saving a screen image of the full screen view currently displayed.

16. A system as claimed in claim 12 and further comprising a database storing images of working documents.

17. A system as claimed in claim 16 wherein said annotation routine is capable of storing document images in the database and retrieving document images from the database to form working document images which are annotatable during performance of the annotation task.

18. A system as claimed in claim 17 wherein the annotation device includes a stylus and said annotation routine generates a file cabinet icon, the annotation routine responding to predefined stylus strokes performed with respect to the icon by moving user selected document images relative to the database.

19. A data processing system comprising:
a processor running a primary multi-window task;
an electronic display;
a stylus providing input of data representing stylus strokes to said processor;
an annotation routine, running in said processor, and, in response to stylus strokes, displaying on said display at least one working document image from a window of the primary task, the working document image to be annotated during the annotation task;
the processor performing an annotation task using said annotation routine, and the display displaying the working document image and annotations made to it during the annotation task;
the processor making a reduced image of said at least one working document image, said reduced image containing recognizable and distinguishable details of said working document image, said reduced image of each working document image thus being unique; and
the processor storing the working document image and reduced image both with any annotations made.

20. Annotation apparatus as claimed in claim 19 wherein the stylus comprises:
a first end for providing additive traces; and
a second end for providing eraser traces, a sequence of the additive traces and eraser traces forming a sequence of input data.

21. The system according to claim 19 wherein upon initiation of said annotation task, said processor stops running said primary task and saves the state of said primary task and on completion of said annotation task returns to said primary task.

22. Annotation apparatus as claimed in claim 19 wherein the annotation routine further responds to predefined stylus strokes by providing a working document image for each window currently displayed during the performance of the primary task, each working document image being annotatable during the annotation task.

23. Annotation apparatus as claimed in claim 22 further comprising storage means for storing an annotated working document image in a database of the primary task.

24. Apparatus as claimed in claim 23 further comprising retrieval means for retrieving an annotated working document image from storage in the database.

25. A data processing system comprising:
a processor programmed with a windowing program and an annotation program;
a display coupled to the processor displaying views generated during execution of a program including a screen view having windows when executing at least said windowing program; and
an annotation input device coupled to the processor, said processor:
in response to a first input from said input device while executing said windowing program beginning execution of the annotation program, and saving a screen image of the screen view on the display, and
in response to a second input from said input device, while said annotation program is running, annotating said saved screen image;
upon completion of annotating the saved screen image, in response to a third input, storing the saved screen image with any annotations made;
making a reduced image of said saved screen image, said reduced image containing recognizable and distinguishable details of said screen image, said reduced image of each screen image thus being unique; and
storing said reduced image containing any annotations made to said saved screen image.

26. A system as claimed in claim 25 and further including stopping performance of all programs being currently executed by the processor and saving the state of the stopped programs in response to said first input and resuming execution of said stopped programs in response to said third input.

27. A system as claimed in claim 25 wherein the annotation input device includes a stylus.

28. A system as claimed in claim 25 wherein the windows are overlapping in the screen view.

29. A system as claimed in claim 25 further comprising a database storing the saved screen image.

30. A system as claimed in claim 29 wherein said annotation routine is capable of storing images in the database and retrieving images from the database to form images which are annotatable during running of the annotation program.

31. A system as claimed in claim 30 wherein said annotation input device is a stylus and said annotation routine generates a file cabinet icon, the annotation program responding to predefined stylus strokes performed with respect to the icon by moving user selected images relative to the database.

32. A data processing system comprising:
a processor running, as a primary task, a windowing program;
an electronic display coupled to the processor displaying a screen view including at least two window views;
an annotation input device coupled to the processor; and
an annotation routine performed by the processor and responsive to the annotation input device to save a screen image of the screen view currently being displayed on the display from performance of the primary task, being further responsive to the annotation input device to annotate the saved screen image, to make a reduced image of said saved screen image, said reduced image containing recognizable and distinguishable details of said screen image, said reduced image of each screen image thus being unique, and to store said screen image and reduced image, both with any annotations made, upon indication of completion of annotating.

33. A system as claimed in claim 32 wherein said annotation device includes a stylus.

34. A system as claimed in claim 32 wherein the windows currently being displayed are displayed as graphically overlapping windows.

35. A system as claimed in claim 32 further comprising a database storing working document images.

36. A system as claimed in claim 35 wherein said annotation routine is capable of storing images of documents in the database and retrieving images of documents from the database to form working document images which are annotatable during performance of the annotation task.

37. A system as claimed in claim 35 wherein said annotation input device includes a stylus, said annotation routine generates a file cabinet icon, the annotation routine responding to predefined stylus strokes performed with respect to the icon by moving user selected document images relative to the database.

38. In a data processing system including an electronic display with a screen, a method of annotating displayed information comprising:
a) operating said system in a windowing environment;
b) displaying at least two windows on the screen to form a screen view;
c) providing an input to said system;
d) in response to said input beginning execution of an annotation program;
e) capturing a screen image of the screen view being displayed as a separate annotatable image;
f) annotating said annotatable image;
g) upon completion of annotation, storing said annotatable image with any annotations made;
h) making a reduced image of said annotatable image, said reduced image containing recognizable and distinguishable details of said annotatable image, said reduced image of each annotatable image thus being unique; and
i) storing said reduced image including any annotations made to said annotatable image.

39. The method according to claim 38 and further including stopping the running of said windowing environment while saving the state of all programs being executed at the time of stopping in response to said input and upon completion of annotation terminating the execution of said annotation program and resuming execution of said programs which were being executed at the time of stopping in response to said input.

40. In a data processing system including an electronic display with a screen, a method of annotating displayed information comprising:
  a) operating said system in a windowing environment;
  b) displaying at least two windows on a screen to form a screen view;
  c) providing an input to said system;
  d) in response to said input beginning execution of an annotation program;
  e) capturing an image at least one window being displayed as a separate annotatable image;
  f) annotating said annotatable image;
  g) upon completion of annotation, storing said annotatable image with any annotations made;
  h) making a reduced image of said annotatable image, said reduced image containing recognizable and distinguishable details of said annotatable image, said reduced image of each annotatable image thus being unique; and
  i) storing said reduced image including any annotations made to said annotatable image.

41. The method according to claim 40 and further including stopping running in said windowing environment while saving the state of all programs being executed at the time of stopping in response to said input and upon completion of annotation terminating the execution of said annotation program and resuming running in said windowing environment.

42. The method according to claim 40 and further including capturing an annotatable image of each window being displayed.

43. The method according to claim 41 and further including capturing an annotatable image of said screen view.

44. The method according to claim 40 and further including capturing an annotatable image of said screen view.

* * * * *

UNITED STATES PATENT AND TRADEMARK OFFICE
CERTIFICATE OF CORRECTION

PATENT NO. : 5,231,578
DATED : Jul. 27, 1993
INVENTOR(S) : Levine et al.

It is certified that error appears in the above-indentified patent and that said Letters Patent is hereby corrected as shown below:

On the cover page, at the upper left-hand corner, "Levin et al." should read --Levine et al.--.

On the cover page, in the listing of inventors, "Stephen R. Levin" should read --Stephen R. Levine--.

On the cover page, in the Related U.S. Application Data:
"Continuation of Ser. No. 360,656, Jun. 2, 1990, abandoned." should read --Continuation of Ser. No. 360,656, Jun. 2, 1989, abandoned which is a continuation-in-part of Ser. No. 265,686, Nov. 1, 1988, abandoned.--.

In Claim 4, col. 15, line 15, "precursor" should read --processor--.

In Claim 8, col. 15, line 49, "first output" should read --first input--.

In Claim 12, col. 15, line 61, "display" should read --data--.

In Claim 12, col. 16, lines 2-3, "to said a window from performance of the primary task, " should read --to save a window image of each window currently being displayed on the display from performance of the primary task,--.

In Claim 12, col. 16, line 11, "response" should read --responsive--.

UNITED STATES PATENT AND TRADEMARK OFFICE
CERTIFICATE OF CORRECTION

PATENT NO. : 5,231,578
DATED : Jul. 27, 1993
INVENTOR(S) : Levine et al

It is certified that error appears in the above-indentified patent and that said Letters Patent is hereby corrected as shown below:

In Claim 12, col. 16, line 12, "to store saved" should read --to store saved--.

Signed and Sealed this

Twelfth Day of July, 1994

*Attest:*

BRUCE LEHMAN

*Attesting Officer*    *Commissioner of Patents and Trademarks*